United States Patent [19]
Wilson

[11] Patent Number: 6,047,651
[45] Date of Patent: Apr. 11, 2000

[54] MULTIPLE ATTACHMENT HOLE DIGGER

[76] Inventor: Orson W. Wilson, 2305 W. 2200 South, Young Ward, Utah 84339

[21] Appl. No.: 09/031,465

[22] Filed: Feb. 26, 1998

[51] Int. Cl.[7] ................................................ A01C 5/02

[52] U.S. Cl. ........................ 111/115; 111/99; 172/21; 294/49; 294/51

[58] Field of Search .................... 294/49, 50, 50.6, 294/50.5, 50.7, 51, 57, 59–61; 7/114–116; 111/92, 99–101, 106, 115; 172/21, 22, 371, 373–375; 254/131.5, 132; D8/7, 10

[56] References Cited

U.S. PATENT DOCUMENTS

| | | | |
|---|---|---|---|
| 1,464,353 | 8/1923 | Crinella | 294/51 |
| 1,757,925 | 5/1930 | Kirkpatrick | 294/49 |
| 2,044,871 | 6/1936 | Beasley | 111/99 |
| 5,228,400 | 7/1993 | Luke | 172/21 X |
| 5,492,070 | 2/1996 | Lefkow | 111/99 X |

FOREIGN PATENT DOCUMENTS 1286930  8/1972  United Kingdom ................ 294/49

*Primary Examiner*—Johnny D. Cherry

[57] ABSTRACT

A hole digger is provided including a post and a hole digging attachment mounted to the post and having a closed bottom face and a tapered periphery.

8 Claims, 4 Drawing Sheets

FIG. 1
FIG. 2
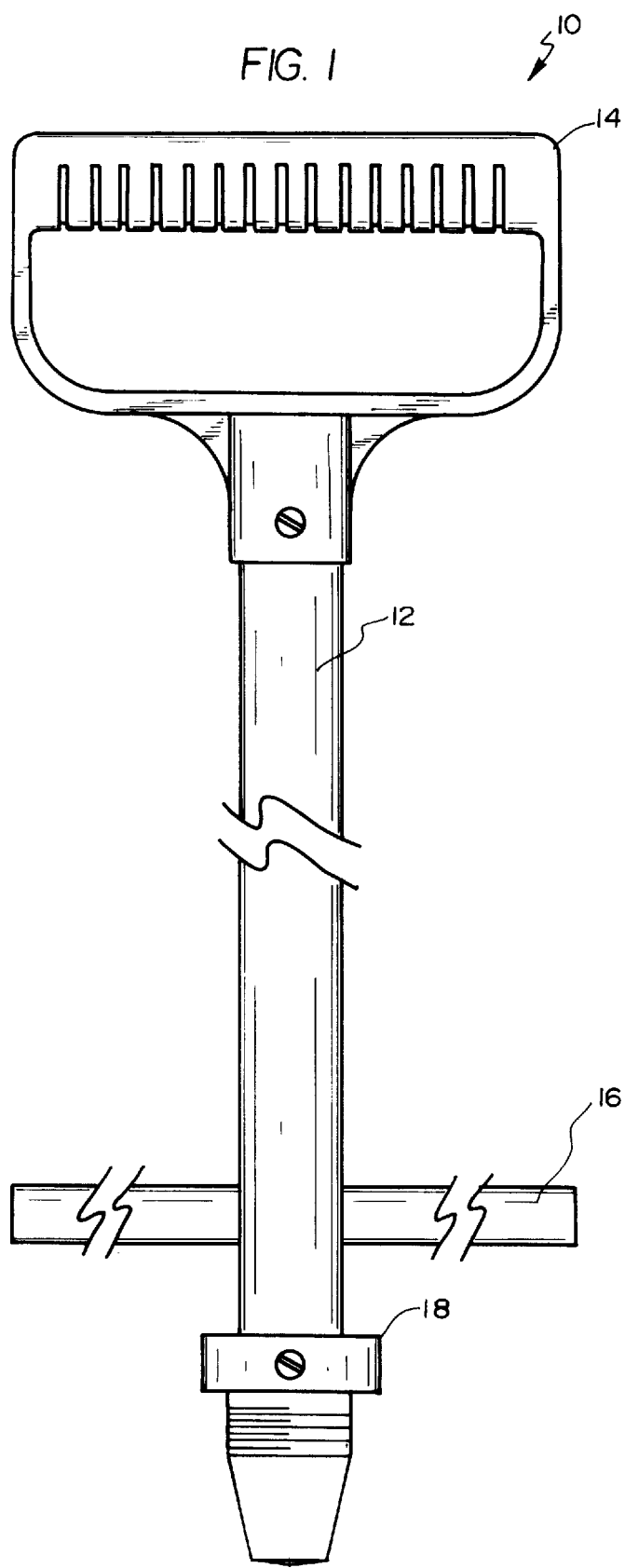
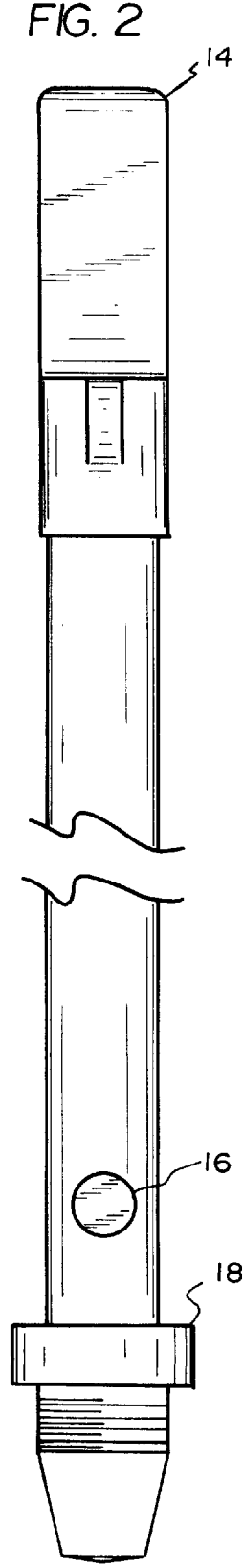

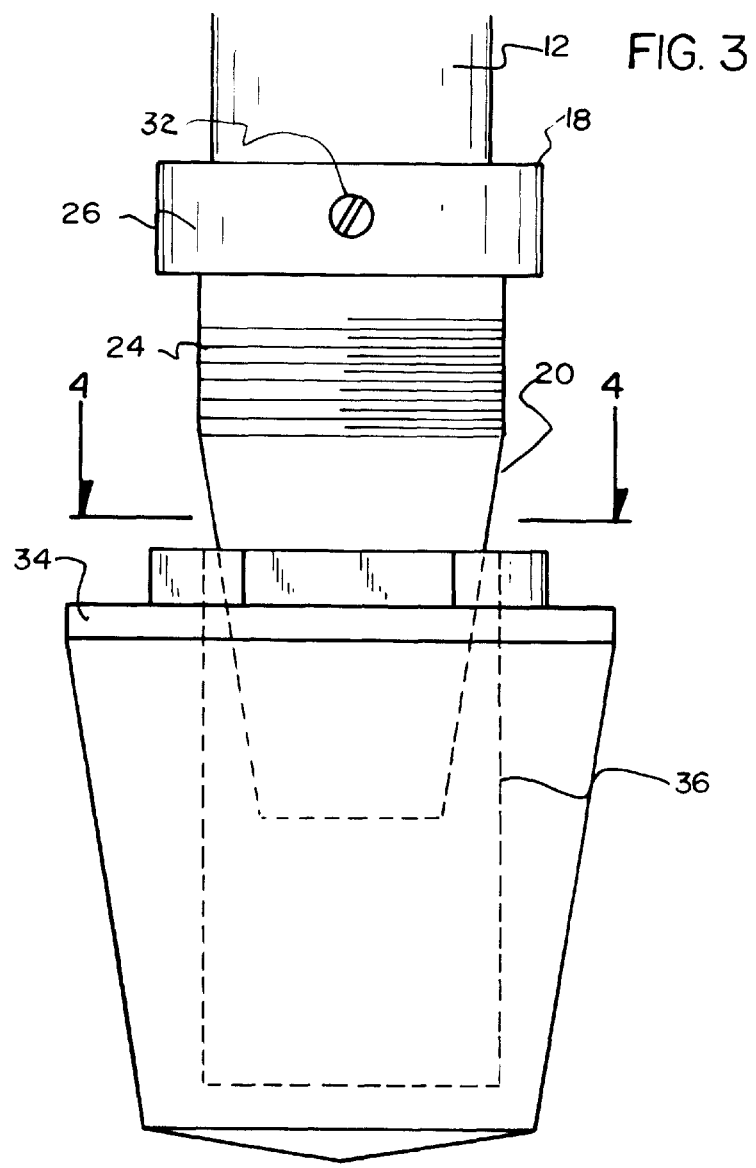
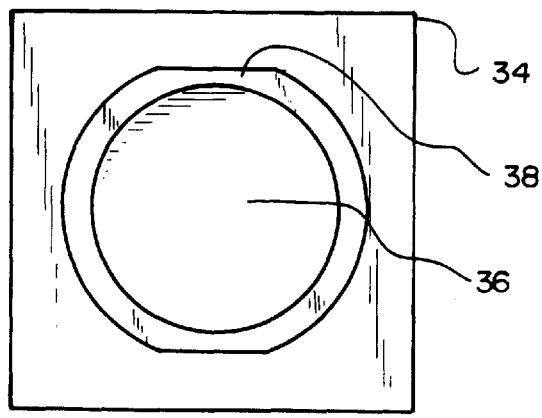

MULTIPLE ATTACHMENT HOLE DIGGER

BACKGROUND OF THE INVENTION

1. Field of the Invention

The present invention relates to hole diggers and more particularly pertains to a new multiple attachment hole digger for forming holes of various sizes.

2. Description of the Prior Art

The use of hole diggers is known in the prior art. More specifically, hole diggers heretofore devised and utilized are known to consist basically of familiar, expected and obvious structural configurations, notwithstanding the myriad of designs encompassed by the crowded prior art which have been developed for the fulfillment of countless objectives and requirements.

Known prior art hole diggers include U.S. Pat. No. 4,209,903; U.S. Pat. No. 4,966,238; U.S. Pat. No. 4,633,957; U.S. Pat. Des. 302,512; U.S. Pat. No. 5,273,331; and U.S. Pat. No. 4,659,127.

In these respects, the multiple attachment hole digger according to the present invention substantially departs from the conventional concepts and designs of the prior art, and in so doing provides an apparatus primarily developed for the purpose of forming holes of various sizes.

SUMMARY OF THE INVENTION

In view of the foregoing disadvantages inherent in the known types of hole diggers now present in the prior art, the present invention provides a new multiple attachment hole digger construction wherein the same can be utilized for forming holes of various sizes.

The general purpose of the present invention, which will be described subsequently in greater detail, is to provide a new multiple attachment hole digger apparatus and method which has many of the advantages of the hole diggers mentioned heretofore and many novel features that result in a new multiple attachment hole digger which is not anticipated, rendered obvious, suggested, or even implied by any of the prior art hole diggers, either alone or in any combination thereof.

To attain this, the present invention generally comprises a cylindrical post having an upper end with a handle coupled thereto. The handle includes a U-shaped support with a gripping bar coupled between top ends thereof. The gripping bar is further equipped with gripping indentations formed therein, as shown in FIG. 1. The post further has a free lower end with a pair of diametrically disposed linear foot pegs coupled thereabove and extending radially from the post. Next provided is a unitary small hole digging attachment including a lower extent with a closed bottom face. As shown in FIGS. 1 & 2, the lower extent of the small hole digging attachment is equipped with an inverted frusto-pyramidal configuration and a predetermined height and diagonal length. Associated therewith is an intermediate extent with a cylindrical configuration and a threaded outer periphery. The intermediate extent has a diametric length which is at least the diagonal length of the lower extent and a height that is ½ that of the lower extent. The small hole digging attachment further includes an upper extent including an annular lip integrally coupled to a top of the intermediate extent and extended upwardly therefrom. Such annular lip serves for defining an interior space for releasably receiving the bottom end of the post. The annular lip of the upper extent has a bore formed therein for allowing the passage of a screw adapted to engage the post. As such, the small hole digging attachment is fixed with respect to the post. Further provided is a plurality of large hole digging attachments, like that shown in FIG. 6. Each hole digging attachment has a closed bottom face and an inverted frusto-pyramidal configuration. The hole digging attachment is equipped with a predetermined height and diagonal length greater than that of the small hole digging attachment. A top face of each large hole digging attachment includes a cylindrical bore with an upper portion having an interior threaded surface. Each large hole digging attachment is thus adapted for screwably engaging the intermediate extent of the small hole digging attachments.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multiple attachment hole digger apparatus and method which has many of the advantages of the hole diggers mentioned heretofore and many novel features that result in a new multiple attachment hole digger which is not anticipated, rendered obvious, suggested, or even implied by any of the prior art hole diggers, either alone or in any combination thereof.

It is another object of the present invention to provide a new multiple attachment hole digger which may be easily and efficiently manufactured and marketed.

It is a further object of the present invention to provide a new multiple attachment hole digger which is of a durable and reliable construction.

An even further object of the present invention is to provide a new multiple attachment hole digger which is susceptible of a low cost of manufacture with regard to both materials and labor, and which accordingly is then susceptible of low prices of sale to the consuming public, thereby making such multiple attachment hole digger economically available to the buying public.

Still yet another object of the present invention is to provide a new multiple attachment hole digger which provides in the apparatuses and methods of the prior art some of the advantages thereof, while simultaneously overcoming some of the disadvantages normally associated therewith.

Still another object of the present invention is to provide a new multiple attachment hole digger for forming holes of various sizes.

Even still another object of the present invention is to provide a new multiple attachment hole digger that includes a post and a hole digging attachment mounted to the post and having a closed bottom face and a tapered periphery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a new multiple attachment hole digger according to the present invention.

FIG. 2 is a side view of the present invention.

FIG. 3 is a view of the small hole digging attachment and one of the large hole digging attachments of the present invention.

FIG. 4 is a top view of one of the large hole digging attachments of the present invention.

DESCRIPTION OF THE PREFERRED EMBODIMENT

Figure 5:
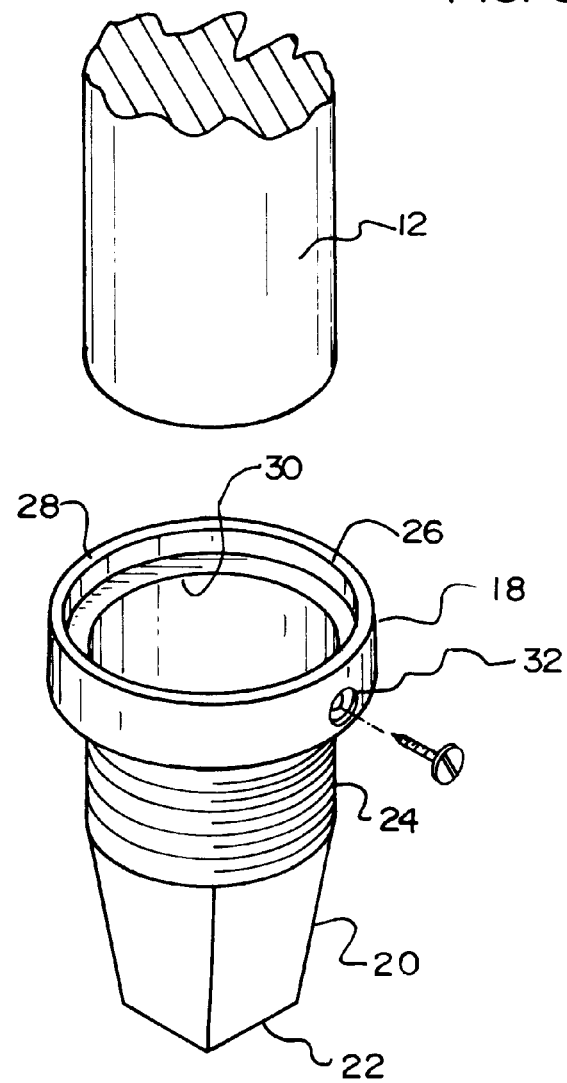
FIG. 5 is an exploded view of the post and small hole digging attachment of the present invention.

With reference now to the drawings, and in particular to FIGS. 1 through 7 thereof, a new multiple attachment hole digger embodying the principles and concepts of the present invention and generally designated by the reference numeral 10 will be described.

The present invention, designated as numeral 10, includes a cylindrical post 12 having an upper end with a handle 14 coupled thereto. The handle includes a U-shaped support with a gripping bar coupled between top ends thereof. The gripping bar is further equipped with gripping indentations formed therein, as shown in FIG. 1. The post also has a free lower end with a pair of diametrically disposed linear foot pegs 16 coupled thereabove and extending radially from the post.

Next provided is a unitary small hole digging attachment 18 including a lower extent 20 with a closed bottom face 22. As shown in FIGS. 1 & 2, the lower extent of the small hole digging attachment is equipped with an inverted frusto-pyramidal configuration and a predetermined height and upper horizontal diagonal length. Associated therewith is an intermediate extent 24 with a cylindrical configuration and a threaded outer periphery. The intermediate extent has a diametric length which is at least the upper horizontal diagonal length of the lower extent and a height that is ½ that of the lower extent.

The small hole digging attachment further includes an upper extent 26 including an annular lip 28 integrally coupled to a top of the intermediate extent and extended upwardly therefrom. Such annular lip serves for defining an interior space for releasably receiving the bottom end of the post. A ledge 30 is preferably provided on which the post may rest during use. The annular lip of the upper extent has a bore 32 formed therein for allowing the passage of a screw adapted to engage the post. As such, the small hole digging attachment is fixed with respect to the post.

Figure 6:
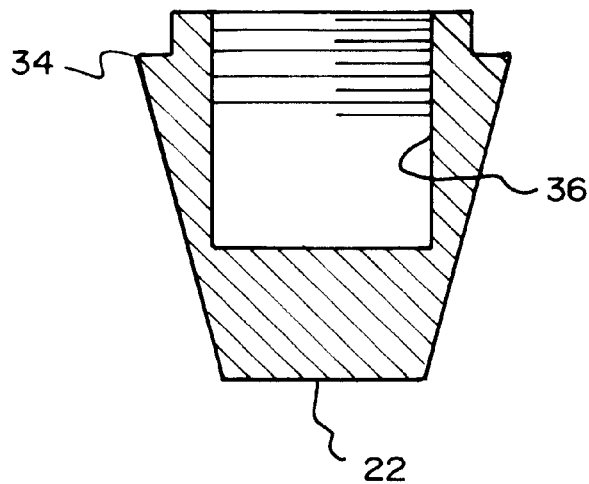
FIG. 6 is a cross-sectional view of one of the large hole digging attachments of the present invention.
Figure 7:
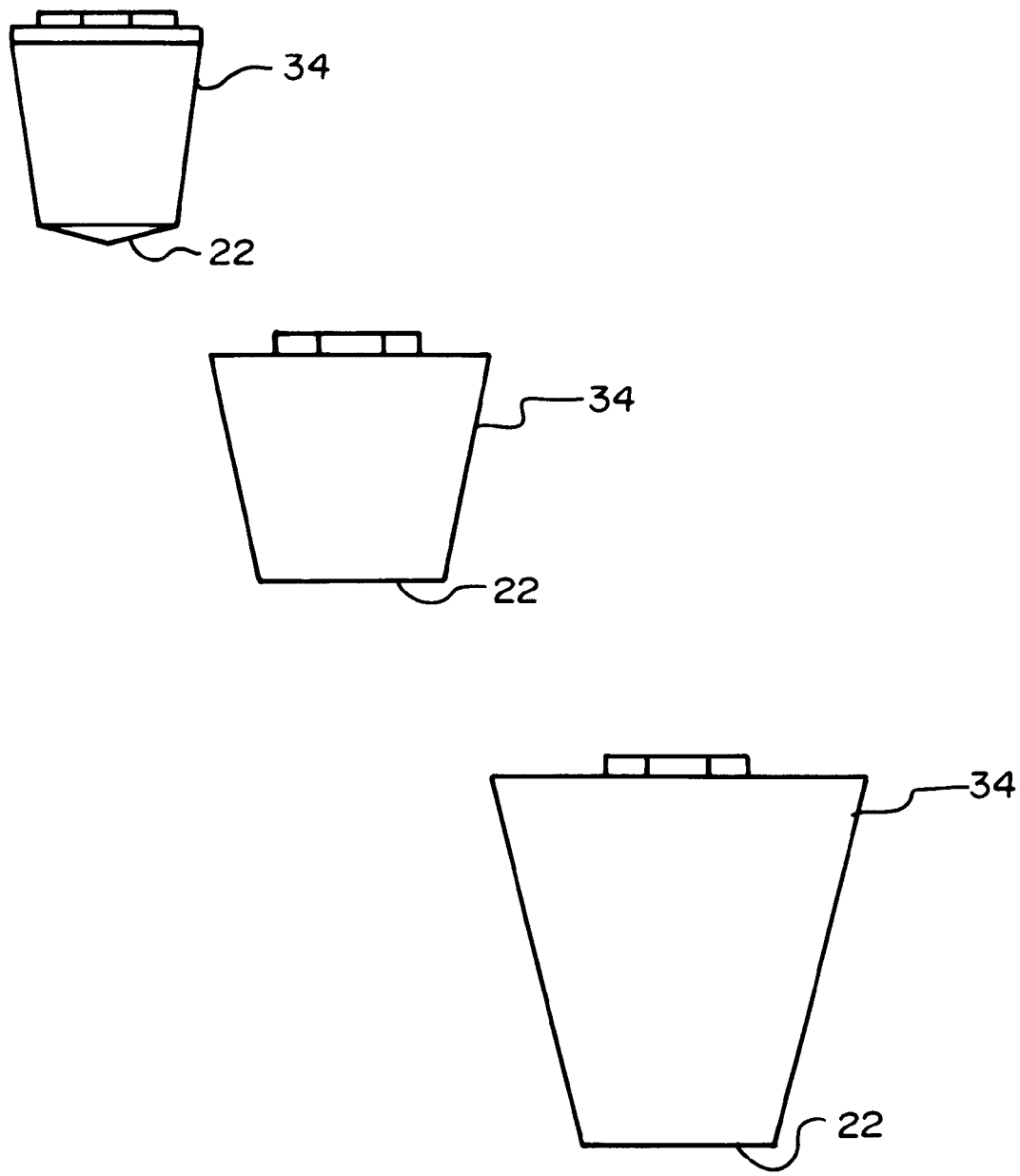
FIG. 7 is a view showing a plurality of large hole digging attachments.

Further provided is a plurality of large hole digging attachments 34, like that shown in FIG. 6. Each hole digging attachment has a closed bottom face and an inverted frusto-pyramidal configuration. The hole digging attachment is equipped with a predetermined height and upper horizontal diagonal length greater than that of the small hole digging attachment. A top face of each large hole digging attachment includes a cylindrical bore 36 with an upper portion having an interior threaded surface.

Each large hole digging attachment is thus adapted for screwably engaging the intermediate extent of the small hole digging attachment. An upper end of each large digging attachment has an upwardly extending sleeve with a pair of flattened sides 38 for allowing engagement with a wrench or the like. It is imperative that a lower portion of the cylindrical bore have a smooth interior surface with a height at least that of the lower extent of the small hole digging attachment. By this design, the lower extent of the small hole digging attachment is freely rotatable within the large hole digging attachment. In the preferred embodiment, the large hole digging attachments have heights of 2, 3 & 4 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hole digger comprising, in combination:
   a cylindrical post having an upper end with a handle coupled thereto including a U-shaped support with a gripping bar coupled between top ends of the support with gripping indentations formed therein, the post further having a free lower end with a pair of diametrically disposed linear foot pegs coupled thereabove and extending radially from the post;

a small hole digging attachment including a lower extent with a closed bottom face and an inverted frusto-pyramidal configuration forming side faces extending upwardly from the bottom face, the lower extent of the small hole digging attachment having a predetermined height and a diagonal width, the diagonal width being the widest distance between two non-adjacent corners of the side faces of the lower extent, an intermediate extent with a cylindrical configuration and a threaded outer periphery having a diametric length at least the diagonal width of the lower extent and a length ½ that of the lower extent, and an upper extent including an annular lip integrally coupled to a top of the intermediate extent and extending upwardly therefrom for defining an interior space for releasably receiving the lower end of the post, wherein the annular lip of the upper extent has a bore formed therein for allowing the passage of a screw adapted to engage the post for maintaining the same in a fixed relationship with respect to the post; and a plurality of large hole digging attachments each having a closed bottom face and an inverted frusto-pyramidal configuration with a predetermined height and a diagonal length width of a top face greater than the diagonal width of the upper face of the small hole digging attachment, a top face of each large hole digging attachment including a cylindrical bore with an upper portion having an interior threaded surface for screwably engaging the intermediate extent of the small hole digging attachment and a lower portion having a smooth interior surface and a height at least that of the lower extent of the small hole digging attachment.

2. A hole digger kit comprising:

a post; and a small hole digging attachment mounted to the post and having a lower extent with a closed bottom face and an inverted frusto-pyramidal configuration, and an intermediate extent with a cylindrical configuration and a threaded outer periphery; and a plurality of large hole digging attachments each having a closed bottom face and an inverted frusto-pyramidal configuration, a top face of each large hole digging attachment including a cylindrical bore forming a cavity for receiving the lower extent of the small hole digging attachment therein such that the lower extent is nested in the large hole digging attachment, the cylindrical bore having an upper portion with an interior threaded surface for screwably engaging the intermediate extent of the small hole digging attachment and a lower portion having a smooth interior surface and a height at least that of the lower extent of the small hole digging attachment.

3. A hole digger as set forth in claim 2 wherein the small hole digging attachment is removably mounted to the post.

4. A hole digger as set forth in claim 2 wherein at least one large hole digging attachment is removably coupled below the small hole digging attachment.

5. A hole digger as set forth in claim 4 wherein the large hole digging attachment encompasses the small hole digging attachment.

6. A hole digger as set forth in claim 4 wherein the large hole digging attachment is threadedly coupled to the small hole digging attachment.

7. A hole digger as set forth in claim 2 wherein the post has a pair of foot pegs and a handle.

8. A hole digger kit comprising, in combination:

a cylindrical post having an upper end with a handle coupled thereto including a U-shaped support with a gripping bar coupled between top ends of the support with gripping indentations formed therein, the post further having a free lower end with a pair of diametrically disposed linear foot pegs coupled thereabove and extending radially from the post;

a small hole digging attachment including a lower extent with a closed bottom face and an inverted frusto-pyramidal configuration forming side faces extending upwardly from the bottom face, the lower extent of the small hole digging attachment having a predetermined height and a diagonal width, the diagonal width being the widest distance between two non-adjacent corners of the side faces of the lower extent, an intermediate extent with a cylindrical configuration and a threaded outer periphery, and an upper extent including an annular lip integrally coupled to a top of the intermediate extent and extending upwardly therefrom for defining an interior space for releasably receiving the lower end of the post, wherein the annular lip of the upper extent has a bore formed therein for allowing the passage of a screw adapted to engage the post for maintaining the same fixed with respect to the post; and a large hole digging attachment having a closed bottom face and an inverted frusto-pyramidal configuration, a top face of the large hole digging attachment including a cylindrical bore forming a cavity for receiving the lower extent of the small hole digging attachment therein such that the lower extent is nested in the large hole digging attachment, the cylindrical bore having an upper portion having an interior threaded surface for screwably engaging the intermediate extent of the small hole digging attachment and a lower portion having a smooth interior surface and a height at least that of the lower extent of the small hole digging attachment.

* * * * *